(12) United States Patent
Rathineswaran et al.

(10) Patent No.: US 10,445,201 B2
(45) Date of Patent: Oct. 15, 2019

(54) SYSTEM AND METHOD FOR AUTOMATED INTEGRATION AND STRESS TESTING OF HARDWARE AND SOFTWARE SERVICE IN MANAGEMENT CONTROLLER USING CONTAINERIZED TOOLBOX

(71) Applicant: American Megatrends International, LLC, Norcross, GA (US)

(72) Inventors: Chandrasekar Rathineswaran, Cumming, GA (US); Clark Kerr, Atlanta, GA (US); Garret Naegle, Atlanta, GA (US); Suraj Rao, Duluth, GA (US)

(73) Assignee: AMERICAN MEGATRENDS INTERNATIONAL, LLC, Norcorss, GA (US)

( * ) Notice: Subject to any disclaimer, the term of this patent is extended or adjusted under 35 U.S.C. 154(b) by 82 days.

(21) Appl. No.: 15/725,769

(22) Filed: Oct. 5, 2017

(65) Prior Publication Data

US 2019/0108110 A1 Apr. 11, 2019

(51) Int. Cl.
*G06F 11/22* (2006.01)
*G06F 11/273* (2006.01)
*G06F 11/263* (2006.01)

(52) U.S. Cl.
CPC ...... *G06F 11/2215* (2013.01); *G06F 11/2294* (2013.01); *G06F 11/2733* (2013.01); *G06F 11/263* (2013.01)

(58) Field of Classification Search
CPC ............. G06F 11/2215; G06F 11/2294; G06F 11/273; G06F 11/2733
See application file for complete search history.

(56) References Cited

U.S. PATENT DOCUMENTS

2006/0004824 A1* 1/2006 Hsieh ............... G06F 11/2294 709/223
2007/0022175 A1* 1/2007 Lu ..................... G06F 11/2294 709/217

(Continued)

FOREIGN PATENT DOCUMENTS

CN 108334411 * 1/2018 ........... G06F 9/5027

OTHER PUBLICATIONS

"Intelligent Platform Management Interface", Dec. 10, 2016, Wikipedia (Year: 2016).*

*Primary Examiner* — Gabriel Chu
(74) *Attorney, Agent, or Firm* — Locke Lord LLP; Tim Tingkang Xia, Esq.

(57) ABSTRACT

Systems and methods for automated integration and stress testing of hardware and software services in a management controller using a containerized toolbox. The method utilizes a containerized toolbox module, which includes multiple testing tools for a web-based protocol, such as a Representational State Transfer (REST) protocol, and an Intelligent Platform Management Interface (IPMI) protocol. A management controller to be tested by the containerized toolbox module provides multiple services accessible under the web-based protocol and the IPMI protocol. In operation, the containerized toolbox module is provided at the management controller, and receives a testing command to perform a plurality of tests to the services of the management controller. Based on the testing command, the containerized toolbox module performs the tests to the services of the management controller using the testing tools of the containerized toolbox module.

16 Claims, 4 Drawing Sheets

(56) References Cited

U.S. PATENT DOCUMENTS

| | | | |
|---|---|---|---|
| 2011/0029650 A1* | 2/2011 | Shah | G06F 11/0748 |
| | | | 709/223 |
| 2012/0047401 A1* | 2/2012 | Wang | G06F 11/2284 |
| | | | 714/32 |
| 2012/0304011 A1* | 11/2012 | Lai | G06F 11/2294 |
| | | | 714/36 |
| 2013/0326278 A1* | 12/2013 | Yin | G06F 11/362 |
| | | | 714/38.1 |
| 2017/0083544 A1* | 3/2017 | Alton | G06F 8/60 |
| 2017/0242758 A1* | 8/2017 | Chou | G06F 1/3287 |
| 2017/0308450 A1* | 10/2017 | Wang | G06F 11/2294 |
| 2017/0322613 A1* | 11/2017 | Lin | G06F 1/3209 |
| 2018/0314507 A1* | 11/2018 | Chien | G06F 8/61 |
| 2019/0050351 A1* | 2/2019 | Sahu | G06F 13/105 |

\* cited by examiner

SYSTEM AND METHOD FOR AUTOMATED INTEGRATION AND STRESS TESTING OF HARDWARE AND SOFTWARE SERVICE IN MANAGEMENT CONTROLLER USING CONTAINERIZED TOOLBOX

FIELD

The present disclosure relates generally to controller technology, and more particularly to systems and methods for automated integration and stress testing of hardware and software services in a management controller using a containerized toolbox.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A management controller may introduce many hardware and software services. Testing all of these hardware and software services on the management controller requires several different tools to be properly configured in order to perform the tests. However, there are different types of management controllers, and each management controller may include different types of platforms and services. Thus, the testing tools available may not be subject to all types of management controllers.

Therefore, an unaddressed need exists in the art to address the aforementioned deficiencies and inadequacies.

SUMMARY

Certain aspects of the disclosure direct to a method for automated integration and stress testing of a plurality of services of a management controller, which includes: providing, at the management controller, a containerized toolbox module comprising a plurality of testing tools for a web-based protocol and an Intelligent Platform Management Interface (IPMI) protocol; receiving, by the containerized toolbox module, a testing command to perform a plurality of tests to the services of the management controller, wherein each of the services is accessible under at least one of the web-based protocol and the IPMI protocol; and performing, by the containerized toolbox module based on the testing command, the tests to the services of the management controller using the testing tools of the containerized toolbox module.

Certain aspects of the disclosure direct to a system, which includes a management controller, including a processor and a storage device, wherein the management controller is configured to provide a plurality of services; and a containerized toolbox module, configured to be provided in the storage device and executable at the processor of the management controller, the containerized toolbox module including a plurality of testing tools for a web-based protocol and an IPMI protocol. The containerized toolbox module, when executed at the processor, is configured to: receive a testing command to perform a plurality of tests to the services of the management controller, wherein each of the services is accessible under at least one of the web-based protocol and the IPMI protocol; and perform, based on the testing command, the tests to the services of the management controller using the testing tools of the containerized toolbox module.

Certain aspects of the disclosure direct to a non-transitory computer readable medium storing computer executable code. The computer executable code includes a containerized toolbox module, which includes a plurality of testing tools for a web-based protocol and an IPMI protocol. The containerized toolbox module, when executed at a processor of a management controller, is configured to: receive a testing command to perform a plurality of tests to a plurality of services provided by the management controller, wherein each of the services is accessible under at least one of the web-based protocol and the IPMI protocol; and perform, based on the testing command, the tests to the services of the management controller using the testing tools of the containerized toolbox module.

In certain embodiments, the management device is a baseboard management controller (BMC).

In certain embodiments, the tests to the services of the management controller include, for a designated service of the services, a stress test to the designated service, wherein the stress test includes a plurality of repeated tests to the designated service using one of the testing tools.

In certain embodiments, the containerized toolbox module is a docker container module.

In certain embodiments, the web-based protocol is a Representational State Transfer (REST) protocol, which may be used for the REDFISH® platform of the management controller.

In certain embodiments, the containerized toolbox module includes a REST script library comprising the testing tools for the REST protocol; an IPMI test library comprising the testing tools for the IPMI protocol; and an environment file storing information for the tests to be performed to each of the hardware and software services of the management controller.

In certain embodiments, the testing command includes configuration information for updating the environment file of the containerized toolbox module.

In certain embodiments, the tests to the services of the management controller include, for a designated service of the services, a plurality of integrated tests to the designated service, wherein the integrated tests include a REST-related test to the designated service under the REST protocol using a corresponding testing tool of the testing tools for the REST protocol in the REST script library; and an IPMI-related test to the designated service under the IPMI protocol using a corresponding testing tool of the testing tools for the IPMI protocol in the IPMI test library.

In certain embodiments, the testing command is a REST command in a human-readable format.

In certain embodiments, the containerized toolbox module is configured to perform the integrated tests for the designated service by: determining the designated service based on information of the REST command; performing the REST-related test to the designated service using the corresponding testing tool for the REST protocol; performing the IPMI-related test to the designated service using the corresponding testing tool for the IPMI protocol; and performing a comparison between test results of the REST-related test and the IPMI-related test.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
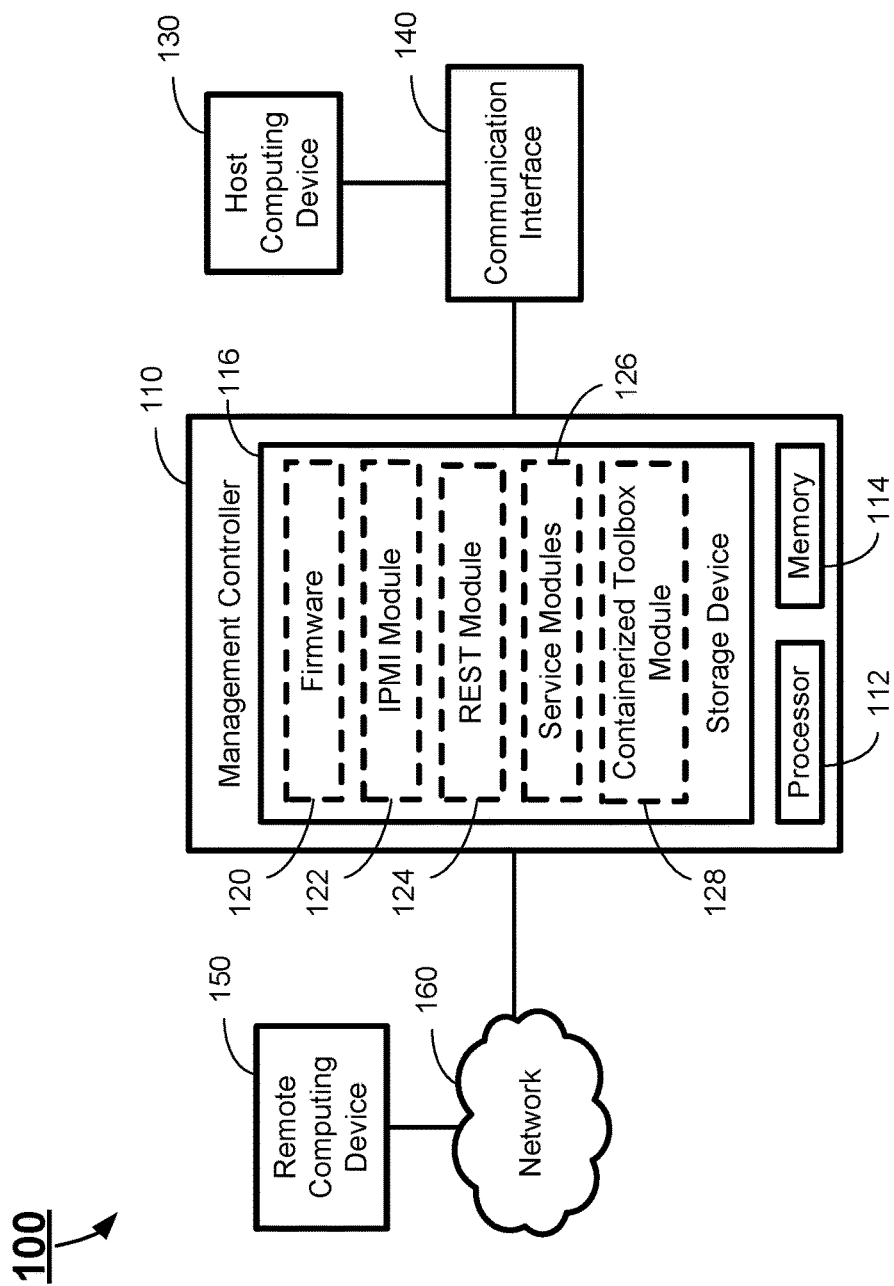
FIG. 1 schematically depicts an exemplary system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

Certain embodiments of the present disclosure relate to computer technology. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As discussed above, a management controller may introduce many hardware and software services, and testing for each of the services requires different tools. There are different types of management controllers, each management controller may include different types of platforms and services. For example, a typical baseboard management controller (BMC) may support the Intelligent Platform Management Interface (IPMI) standard. IPMI is an industry standard and is described in, e.g., "IPMI: Intelligent Platform Management Interface Specification, Second Generation, v.2.0, Feb. 12, 2004," which is incorporated herein by reference in its entirety. IPMI defines a protocol, requirements and guidelines for implementing a management solution for server-class computer systems. The features provided by the IPMI standard include power management, system event logging, environmental health monitoring using various sensors, watchdog timers, field replaceable unit information, in-band and out-of-band access to the management controller, simple network management protocol (SNMP) traps, etc.

However, a recent trend for the management controller may introduce web-based services, such as services under the Representational State Transfer (REST) protocol. REST (also referred to as RESTful) services provide interoperability between computer systems on the Internet. In a management controller platform that supports the REST service, a REST-based application interface (API), e.g., a firmware manageability API, may be provided, allowing a user to access to the configurable computing resources of the management controller or its host computer. For example, the REST services may include a REDFISH® service. REDFISH® is an open industry standard specification and schema that specifies a RESTful interface and utilizes JavaScript Object Notation (JSON) and OData for the management of scale-out computing servers and for accessing data defined in model format to perform out-of-band systems management. The REST services may support some or all of the requirements of "Redfish Scalable Platforms Management API Specification, Version: 1.0.0, Document Identifier: DSP0266, Date: 2015 Aug. 4," which is incorporated herein in its entirety by reference.

There are existing testing tools available for the services of the management controller under the IPMI protocol. For management controllers that support the REST services, there are also web-based scripts that allow a user to perform web-based tests to the REST services. However, there is no integration tool that may perform tests to both IPMI and the REST services. In certain embodiments, when certain hardware and/or software services provided by a management controller supports both IPMI and REST, there is no tool to perform a collaborated test for the services under both IPMI and REST. In other words, a user may perform individual test to the services using IPMI tools and REST scripts respectively, but the user cannot automatically collaborate the test results obtained using the respective testing tools under IPMI and REST.

In view of the deficiencies, certain aspects of the present disclosure direct to systems and methods for automated integration and stress testing of a plurality of hardware and software services of a management controller using a containerized toolbox module. In particular, the containerized toolbox module may be pre-configured with testing tools required for testing the services of the management controller. The tests to be performed on the management controller may include automation, integrated tests, and stress testing for certain services. This container toolbox module may also be portable from one platform to another, and it can be reconfigured for one or more management controllers using a configurable environment file.

FIG. 1 schematically depicts an exemplary system according to certain embodiments of the present disclosure. As shown in FIG. 1, the system 100 includes a management controller 110. Optionally, the system 100 may further include a host computing device 130, which is communicatively connected to the management controller 110 via a communication interface 140, and a remote computing device 150, which is communicatively connected to the management controller 110 via a network 160. The management controller 110 may be used to manage and control the host computing device 130 via the communication interface 140, and a user at the remote computing device 150 may access the management controller 110 remotely via the network 160. In certain embodiments, the communication interface 140 may be a system interface, such as a keyboard controller style (KCS) interface, or may be a universal serial bus (USB) interface. In certain embodiments, the network 160 may be a wired or wireless network, and may be of various forms. Examples of the network 160 may include, but is not limited to, a local area network (LAN), a wide area network (WAN) including the Internet, or any other type of networks.

The management controller 110 is a specialized microcontroller configured to provide the service to the users. In certain embodiments, the management controller 110 may be a BMC used for baseboard management purposes. Alternatively, the management controller 110 may be a management controller for other purposes, such as chassis management, rack management, virtual machine management, backplane or enclosure management, or other type of purposes. In certain embodiments, the management controller 110 is the target for performing a plurality of tests.

The host computing device 130 is a computing device configured to function as a server and managed by the management controller 110, and the remote computing device 150 is a computing device remotely connected to the management controller 110. In certain embodiments, each of the host computing device 130 and the remote computing device 150 may be a general purpose computer or a specific purpose computer. In certain embodiments, when the management controller 110 is a BMC, the host computing device 130 may include a baseboard or the "motherboard" (not shown), which is a printed circuit board to which a multitude of components or devices may be connected by way of a system bus or other electrical communication paths, and the BMC 110 may be a component on the baseboard.

In certain embodiments, the management controller 110 may support the IPMI standard as well as a web-based standard, such as a REST standard. In this case, the services provided by the management controller 110 may communicate with other computing devices (e.g., the host computing device 130 and/or the remote computing device 150) using IPMI or web-based communications. For example, the host computing device 130 may communicate with the management controller 110 via an in-band channel of the communication interface 140 using the IPMI protocol, and the remote computing device 150 may communicate with the management controller 110 via an out-of-band channel through the network 160 to access the REST services provided by the management controller 110. In this case, the communication interface 140 must be an interface that allows IPMI communication. In certain embodiments, the REST services may include a REDFISH® service as discussed above.

As shown in FIG. 1, the management controller 110 includes a processor 112, a memory 114, and a storage device 116. Further, the management controller 110 may include other hardware components and software components (not shown) to perform its corresponding tasks. For example, the management controller 110 may include a network interface, such as a network interface card (NIC), which is used to connect the management controller 110 to the out-of-band network 160. Other examples of the hardware and software components of the management controller 110 may include, but not limited to, other required memory, interfaces, buses, Input/Output (I/O) modules and peripheral devices.

The processor 112 is the processing core of the management controller 110, configured to control operation of the management controller 110. In certain embodiments, the processor 112 may execute any computer executable code or instructions, such as the firmware 120, the IPMI module 122, the REST module 124, the service modules 126, and a containerized toolbox module 128 provided to perform the testing process to the management controller 110, or other applications and instructions on the management controller 110. In certain embodiments, the management controller 110 may run on more than one processor, such as two processors, four processors, eight processors, or any suitable number of processors.

The memory 114 can be a volatile memory, such as the random-access memory (RAM), for storing the data and information during the operation of the management controller 110. In certain embodiments, the memory 114 may be a volatile memory array. In certain embodiments, the management controller 110 may run on more than one memory 114.

The storage device 116 is a non-volatile data storage media for storing computer executable code or instructions for performing the operation of the management controller 110. In certain embodiments, the computer executable code or instructions of the management controller 110 may be implemented as one or more application programs or modules. Examples of the storage device 116 may include non-volatile memory such as flash memory, non-volatile random-access memory (NVRAM), memory cards, USB drives, hard drives, floppy disks, optical drives, or any other types of data storage devices. In certain embodiments, the management controller 110 may have multiple storage devices 116, which may be identical storage devices or different types of storage devices, and the firmware 120, the IPMI module 122, the REST module 124 and the service modules 126, and other applications or data of the management controller 110 may be stored in one or more of the storage devices 116 of the management controller 110. It should be noted that the containerized toolbox module 128 is not an integral part of the computer executable code or instructions of the management controller 110, and is only provided in the storage device 116 for testing purposes.

As shown in FIG. 1, the applications and data stored in the storage device 116 of the management controller 110 include the firmware 120, the IPMI module 122, the REST module 124, and the service modules 126. Further, in performing the testing process to the management controller 110, the containerized toolbox module 128 is also provided in the storage device 116. As discussed above, each of the firmware 120, the IPMI module 122, the REST module 124 and the service modules 126 may be formed by the computer executable code or instructions executable at the processor 112. The containerized toolbox module 128, when being provided in the storage device 116, is also executable at the processor 112. In certain embodiments, In certain embodiments, each of the firmware 120, the IPMI module 122, the REST module 124 and the service modules 126 may further include sub-modules. Alternatively, in certain embodiments, some or all of the firmware 120, the IPMI module 122, the REST module 124 and the service modules 126 may be combined to form a single module. In certain embodiments, the storage device 116 may store other applications independent from the firmware 120, the IPMI module 122, the REST module 124, the service modules 126 and the containerized toolbox module 128.

The firmware 120 stored in the storage device 116 includes the computer executable code that may be executed at the processor 112 to enable the operations of the management controller 110. In certain embodiments, the firmware 120 may include one or more modules or software components that may be executed independently. In certain embodiments, the IPMI module 122 and the REST module 124 may be a part of the firmware 120, and some or all of the service modules 126 may be stored in a file system provided by the firmware 120. In certain embodiments, each of the IPMI module 122, the REST module 124, and the service modules 126 may respectively be a separate software module independent from the firmware 120.

The IPMI module 122 is a software application configured to provide IPMI services for the management controller 110. Specifically, when the management controller 110 needs to perform an IPMI communication with the host computing device 130 (or any other computing device), the IPMI module 122 may convert the data to be transmitted through the IPMI communication to form an IPMI message, or convert the IPMI message received back to the data being transmitted. In certain embodiments, the data being transmitted may be provided by or sent to one of the services provided by the service modules 126.

The REST module 124 is a software application configured to provide REST support for the services provided by the management controller 110. In certain embodiments, the REST module 124 may provide a REST-based application interface (API), e.g., a firmware manageability API, that may be used to access the services. For example, the REST service may include a REDFISH® service.

In certain embodiments, the applications and data stored in the storage device 116 of the management controller 110 may further include other modules. For example, a Secure Shell (SSH) module is a module configured to provide SSH based management features for the services provided by the management controller 110. SSH is a cryptographic network protocol for operating network services securely over an unsecured network. In this case, the SSH module may provide a SSH-based interface that may be used to access the services. Alternatively, other modules, such as a Simple Network Management Protocol (SNMP) module, may be used to provide the corresponding client interfaces that handle the services.

Each of the service modules 126 is a software application configured to provide a corresponding service of the management controller 110. In certain embodiments, the management controller 110 may include multiple service modules 126 to provide various different services. It should be noted that each of the REST module 124 and the IPMI module 122, by definition, is also a service module that provides the corresponding REST/IPMI services. Examples of the services being provided by the service modules 126 may include, without being limited to, a web server service, a media redirection service, a keyboard-mouse-video (KVM) redirection service, or any other types of services that is suited to be provided on the management controller 110.

The containerized toolbox module 128 is a portable container module for performing automated integration and stress testing of the services of the management controller 110. It should be noted that the containerized toolbox module 128 is not an integral part of the firmware 120 of the management controller 110. Instead, the containerized toolbox module 128 is generally provided to the management controller 110 when there is a need to perform a testing process to the services of the management controller 110. In certain embodiments, the containerized toolbox module 128 includes all of the testing tools that may be available to perform the tests to the services provided by the management controller 110. It should be noted that some of the testing tools may be provide to perform testing under one of the protocols, such as the REST protocol and the IPMI protocol, and the containerized toolbox module 128 may be pre-configured such that these testing tools may be used to provide the required testing process to the services of the management controller 110.

In certain embodiments, the containerized toolbox module 128 may be a docker container module. Docker is a popular open-source container application that allows a coder or developer to package an application, its interdependencies and associated libraries in a single container unit. A major advantage of using the docker container is that docker containers on a single machine share the same operating system kernel, which helps in boosting performance and saving a lot of memory. Docker containers may be used to automate the repetitive tasks of setting up and configuring development environments so that developers can focus on what matters: building great software. Developers using docker do not have to install and configure complex databases nor worry about switching between incompatible language toolchain versions. When an application is "dockerized" or formed in a docker container module, that complexity is pushed into containers that are easily built, shared and run.

Figure 2:
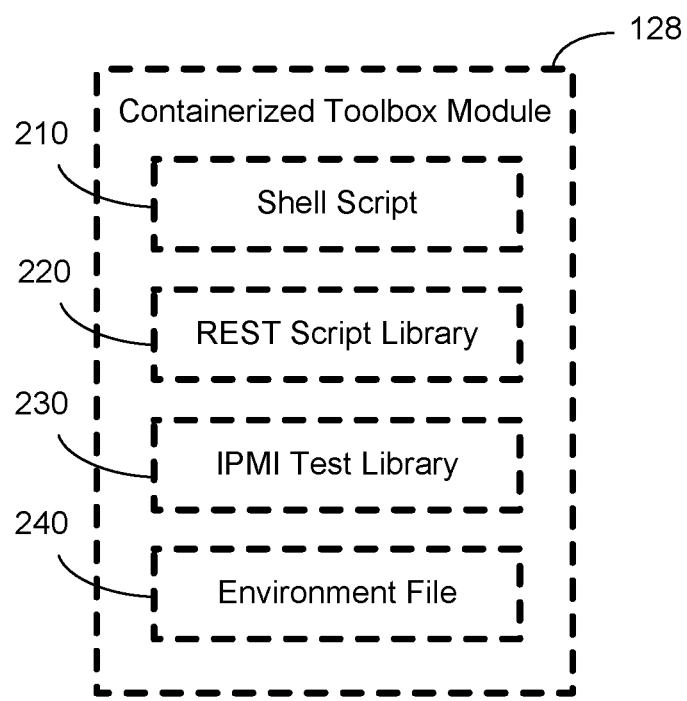
FIG. 2 schematically depicts a containerized toolbox module according to certain embodiments of the present disclosure.

FIG. 2 schematically depicts a containerized toolbox module according to certain embodiments of the present disclosure. As shown in FIG. 2, the containerized toolbox module 128 may be a docker container module, which includes a shell script 210, a REST script library 220, an IPMI test library 230, and an environment file 240.

The shell script 210 is a program designed to set up the containerized toolbox module 128. In certain embodiments, the shell script 210 may be used to process a testing command, and set or update the information in the environment file 240, allowing the containerized toolbox module 128 to run and perform the testing process to the management controller 110 using the testing tools in the REST script module 220 and the IPMI test module 230. In certain embodiments, the shell script 210 also performs any necessary cleanup and logging process for the containerized toolbox module 128.

The REST script module 220 is a collective module storing the testing tools for the REST protocol. In certain embodiments, each of the testing tools stored in the REST script module 220 may be a test script that is currently available for perform tests to a certain service of the management controller 110. For example, when REDFISH® is used as the REST service provided by the REST module 124 of the management controller 110, the REST script module 220 may store all the test scripts that may communicate with the REDFISH® service provided on the management controller 110 to perform the tests. Since the containerized toolbox module 128 may be used for different platforms or different management controllers, the number of the test scripts stored in the REST script module 220 may be more than the number of services provided by the management controller 110, such that the REST script module 220 may cover all of the tests to be performed to the services provided by the management controller 110 under the REST protocol.

The IPMI test module 230 is a collective module storing the testing tools for the IPMI protocol. In certain embodiments, each of the testing tools stored in the IPMI test module 230 may be an IPMI-compatible test tool or application that is currently available for perform tests to a certain service of the management controller 110. For example, the IPMI test module 230 may store all the testing tools that may communicate with the management controller 110 by sending IPMI messages to the management controller 110 in order to perform the tests under the IPMI protocol. Since the containerized toolbox module 128 may be used for different platforms or different management controllers, the number of the testing tools stored in the IPMI test module 230 may be more than the number of services provided by the management controller 110, such that the IPMI test module 230 may cover all of the tests to be performed to the services provided by the management controller 110 under the IPMI protocol.

The environment file 240 is a file storing information for the tests to be performed to each of the hardware and software services of the management controller 110. As discussed above, the purpose of the containerized toolbox module 128 is to provide automated integration and stress testing to the services of the management controller 110. Thus, the information stored in the environment file 240 should indicate the tests to be performed to the services of the management controller 110, and an integration sequence for performing the tests. In this case, the containerized toolbox module 128 may perform the tests automatically without user intervention.

In certain embodiments, the information stored in the environment file 240 may be updated by a testing command to the containerized toolbox module 128. Specifically, a user may send the testing command to the containerized toolbox module 128, to perform the tests to the services of the management controller 110, and the testing command may include the information to indicate the services being provided by the management controller 110, the tests to be performed to the services of the management controller 110, and an integration sequence for performing the tests. In this case, the shell script 210 may process the testing command and update the information stored in the environment file 240. In certain embodiments, the testing command may be a REST command in a human-readable format, such that the user may write the command and the updated information in the human-readable format to instruct the containerized toolbox module 128 to update the information stored in the environment file 240 and perform the testing process.

It should be noted that the contents of the containerized toolbox module 128 is not limited to the scripts, libraries and files as shown in FIG. 2. In certain embodiments, when the storage device 116 of the management controller 110 further includes other modules to handle the services, the containerized toolbox module 128 may also include corresponding script or library modules to store the testing tools for the corresponding protocols used by these modules. For example, the containerized toolbox module 128 may include a SSH library for storing the testing tools for the SSH protocol when a SSH module is provided in the management controller 110.

In certain embodiments, for a designated service provided by the management controller 110, the containerized toolbox module 128 may perform more than one test based on the information of the environment file 240. For example, the containerized toolbox module 128 may perform a stress test to a designated service. The stress test may include a plurality of repeated tests, in which one test is performed to the designated service repetitively to ensure the test result of each repeated test to the designated service is consistently identical or similar.

In certain embodiments, for a designated service provided by the management controller 110, the containerized toolbox module 128 may perform a plurality of integrated tests to the designated service, where the integrated tests include different tests under different protocols, in order to ensure that the test results for each of the integrated tests under different protocols are identical. For example, the integrated tests may include a REST-related test and an IPMI-related test. The REST-related test is under the REST protocol, which utilizes a corresponding testing tool for the REST protocol in the REST script library 220, such as a REST script. The IPMI-related test is under the IPMI protocol, which utilizes a corresponding testing tool for the IPMI protocol in the IPMI test library 230.

Figure 3:
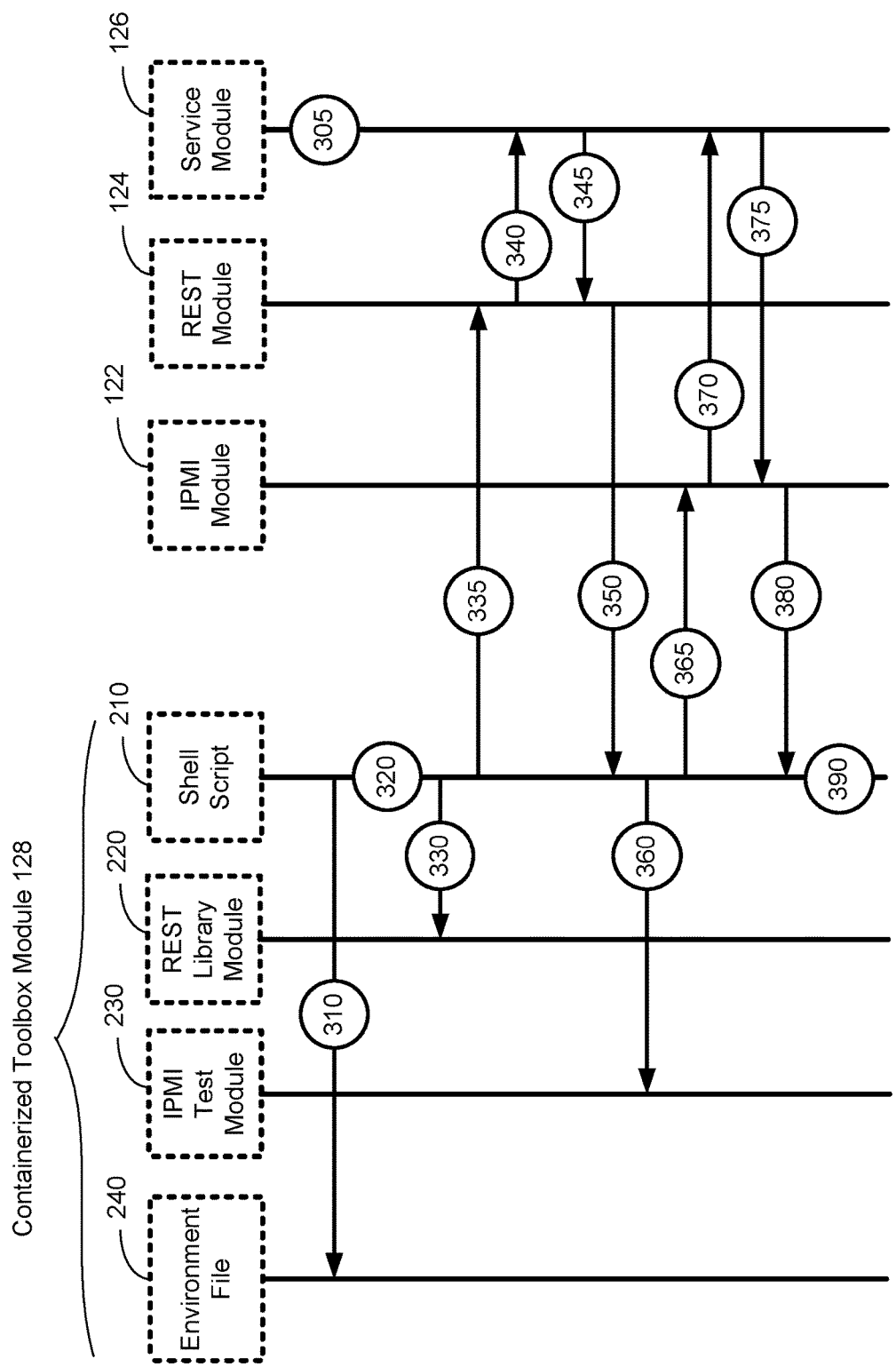
FIG. 3 depicts a process of performing integrated tests for a designated service of a management controller using the containerized toolbox module according to certain embodiments of the present disclosure.

FIG. 3 depicts a process of performing integrated tests for a designated service of a management controller using the containerized toolbox module according to certain embodiments of the present disclosure. In certain embodiments, the process or method as shown in FIG. 3 may be implemented by a system as shown in FIG. 1 and the containerized toolbox module 128 as shown in FIG. 2 for performing automated integration and stress testing of any service or services provided by the management controller 110. It should be particularly noted that, unless otherwise stated in the present disclosure, the steps of the method or process may be arranged in a different sequential order, and are thus not limited to the sequential order as shown in FIG. 3.

As shown in FIG. 3, at the management controller 110, at procedure 305, a service module 126 may be executed to provide a designated service, which is to be tested and supports both the REST protocol and the IPMI protocol. At procedure 310, when the containerized toolbox module 128 is executed, the shell script 210 accesses the information stored in the environment file 240 to get the tests to be performed and the services of the management controller 110 to be tested. At procedure 320, the shell script 210 processes with the information obtained from the environment file 240 and initiates the testing process. Specifically, the shell script 210 may determine, based on the information obtained from the environment file 240, the services of the management controller 110 to be tested, and one of the services to be tested is the designated service. As discussed above, the information obtained from the environment file 240 may be updated using the information of the testing command, such as a REST command. In other words, the shell script 210 may determine, based on the information of the testing command, the services of the management controller 110 to be tested.

In the testing process, at a certain point, the testing may proceed to perform the integrated tests to the designated service. Since the same designated service is tested with all the integrated tests, the shell script 210 may start with either the REST-related test or the IPMI-related test. In the following procedures as shown in FIG. 3, the REST-related test is performed prior to the IPMI-related test. However, the sequence of the integrated tests may be altered.

At procedure 330, the shell script 210 accesses the REST library module 220 to obtain a corresponding testing tool for the REST protocol, such as a REST script corresponding to the designated service, which may be used to perform the REST-related test to the designated service. At procedure 335, the shell script 210 may run the corresponding testing tool, which sends a web-based signal or instruction under the REST protocol to the REST module 124 of the management controller 110. At procedure 340, the REST module 124 forwards the web-based signal or instruction to the designated service to perform the REST-related test to the designated service. At procedure 345, the designated service returns a response to the REST module 124, and at procedure 350, the REST module 124 sends the response of the designated service back to the containerized toolbox module 128.

At procedure 360, the shell script 210 accesses the IPMI test module 230 to obtain a corresponding testing tool for the IPMI protocol to the designated service, which may be used to perform the IPMI-related test to the designated service. At procedure 365, the shell script 210 may run the corresponding testing tool, which sends an IPMI message to the IPMI module 122 of the management controller 110. The IPMI message contains an instruction to the designated service, which should trigger the similar features of the designated service as the instruction under the REST protocol does at the procedure 335. At procedure 370, the IPMI module 122 processes the IPMI message to retrieves the instruction, and forward the instruction to the designated service to perform the IPMI-related test to the designated service. At procedure 375, the designated service returns a response to the IPMI module 122, and at procedure 380, the IPMI module 122 constructs an IPMI response message using the response from the designated service, and sends the IPMI response message back to the containerized toolbox module 128.

Once the containerized toolbox module 128 receives the responses from the designated service under both the REST protocol and the IPMI protocol, at procedure 390, the shell script 210 may perform a comparison between test results of the REST-related test and the IPMI-related test. Theoretically, since the integrated tests apply to the same designated service, the test results of the REST-related test and the IPMI-related test should match each other. For example, the designated service may be a network related service which generates the Internet protocol (IP) address of the management controller 110 as the response to the tests. Since the management controller 110 is assigned with one IP address, the test results (i.e., the IP address of the management controller 110) of the REST-related test and the IPMI-related test to the designated service should be identical. If the comparison between the test results leads to an unmatched result, the integration tests may fail, indicating that the designated service may not correctly support both the IPMI and REST protocols.

Figure 4:
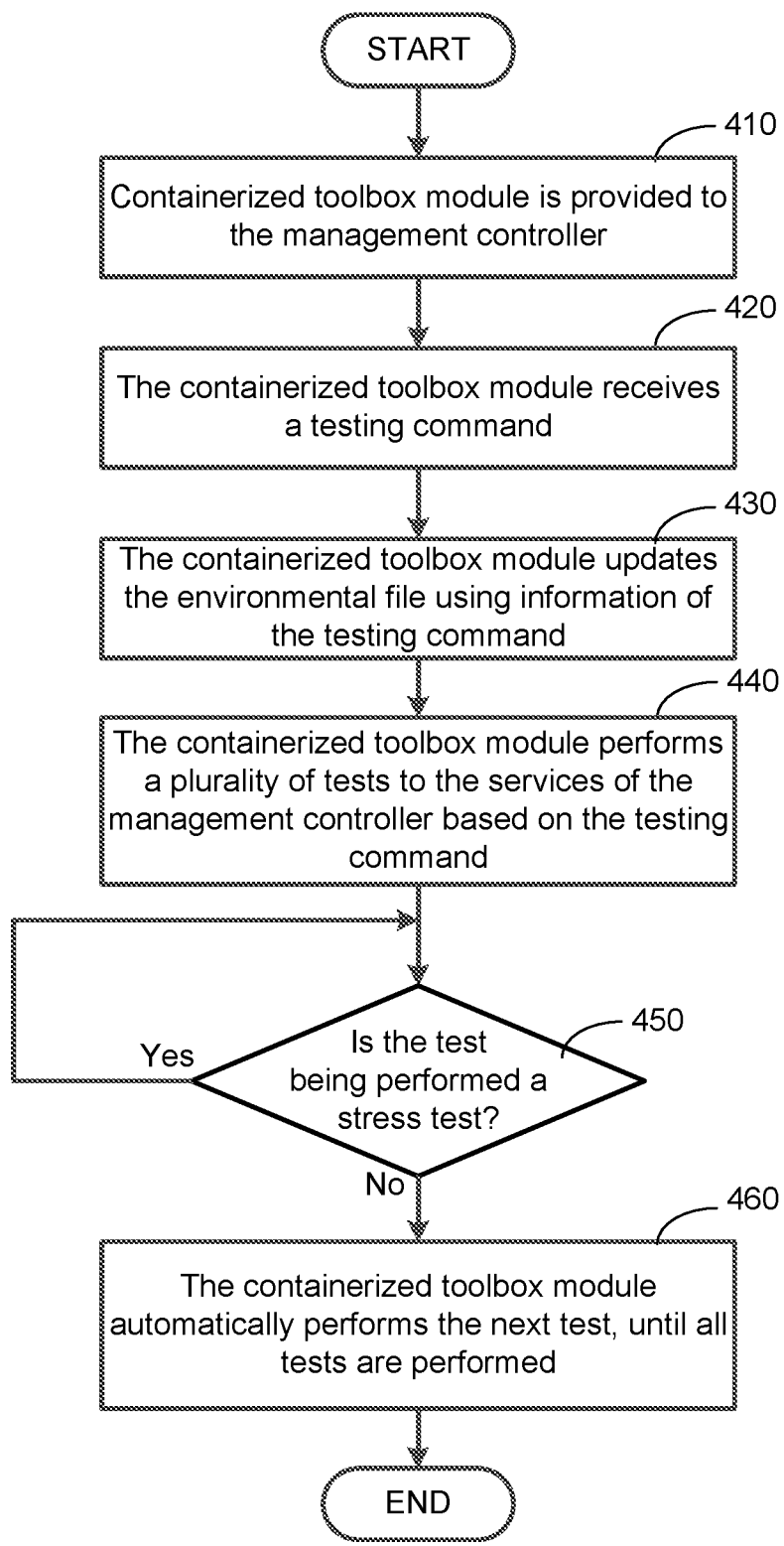
FIG. 4 depicts a flowchart of a method for automated integration and stress testing of a plurality of services of a management controller according to certain embodiments of the present disclosure.

FIG. 4 depicts a flowchart of a method for automated integration and stress testing of a plurality of services of a management controller according to certain embodiments of the present disclosure. In certain embodiments, the method as shown in FIG. 4 may be implemented by a system as shown in FIG. 1 and the containerized toolbox module 128 as shown in FIG. 2 for performing automated integration and stress testing of any service or services provided by the management controller 110. It should be particularly noted that, unless otherwise stated in the present disclosure, the steps of the method or process may be arranged in a different sequential order, and are thus not limited to the sequential order as shown in FIG. 4.

As shown in FIG. 4, at procedure 410, the containerized toolbox module 128 is provided to the management controller 110. At procedure 420, the containerized toolbox module 128 receives a testing command. In certain embodiments, the testing command may be a REST command. At procedure 430, the containerized toolbox module 128 may update the environment file 240 using the information of the testing command.

At procedure 440, the containerized toolbox module 128 performs a plurality of tests to the services of the management controller 110 based on the testing command. In certain embodiments, for a designated service provided by the management controller 110, the tests may include an integrated test as described in the process as shown in FIG. 3, or may be a stress test. At procedure 450, the containerized toolbox module 440 may check if the test being performed is a stress test. If so, the test may be performed repeated. If not, at procedure 460, the containerized toolbox module 440 may automatically perform the next test, until all tests are performed.

In certain embodiments, the method as described above and shown in FIG. 4 may be applied to any type of management controller 110 using the same containerized toolbox module 128. Since all testing tools for the REST protocol and the IPMI protocol are provided in the containerized toolbox module 128, the containerized toolbox module 128 may be pre-configured to execute on any management controller 110 to perform the testing process for the management controller 110.

In a further aspect, the present disclosure is related to a non-transitory computer readable medium storing computer executable code. In certain embodiments, the code may be the containerized toolbox module 128 as described above. In certain embodiments, the non-transitory computer readable medium may include, but not limited to, any physical or virtual storage media that stores the containerized toolbox module 128. In certain embodiments, the non-transitory computer readable medium may be implemented as the storage device 116 of the management controller 110 as shown in FIG. 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method for automated integration and stress testing of a plurality of services of a management controller, comprising:
    providing, at the management controller, a containerized toolbox module comprising a plurality of testing tools for a web-based protocol and an Intelligent Platform Management Interface (IPMI) protocol, wherein the web-based protocol is a Representational State Transfer (REST) protocol;
    receiving, by the containerized toolbox module, a testing command to perform a plurality of tests to the services of the management controller, wherein each of the services is accessible under at least one of the web-based protocol and the IPMI protocol; and
    performing, by the containerized toolbox module based on the testing command, the tests to the services of the management controller using the testing tools of the containerized toolbox module,
    wherein the containerized toolbox module comprises:
        a REST script library comprising the testing tools for the REST protocol;
        an IPMI test library comprising the testing tools for the IPMI protocol; and
        an environment file storing information for the tests to be performed to each of the hardware and software services of the management controller.

2. The method of claim 1, wherein the management controller is a baseboard management controller (BMC).

3. The method of claim 1, wherein the tests to the services of the management controller comprise, for a designated service of the services, a stress test to the designated service, wherein the stress test comprises a plurality of repeated tests to the designated service using one of the testing tools.

4. The method of claim 1, wherein the containerized toolbox module is a docker container module.

5. The method of claim 1, wherein the testing command comprises configuration information for updating the environment file of the containerized toolbox module.

6. The method of claim 1, wherein the tests to the services of the management controller comprise, for a designated service of the services, a plurality of integrated tests to the designated service, wherein the integrated tests comprise:
    a REST-related test to the designated service under the REST protocol using a corresponding testing tool of the testing tools for the REST protocol in the REST script library; and
    an IPMI-related test to the designated service under the IPMI protocol using a corresponding testing tool of the testing tools for the IPMI protocol in the IPMI test library.

7. The method of claim 6, wherein the testing command is a REST command in a human-readable format.

8. The method of claim 7, wherein the containerized toolbox module is configured to perform the integrated tests for the designated service by:
    determining the designated service based on information of the REST command;
    performing the REST-related test to the designated service using the corresponding testing tool for the REST protocol;
    performing the IPMI-related test to the designated service using the corresponding testing tool for the IPMI protocol; and performing a comparison between test results of the REST-related test and the IPMI-related test.

9. A system, comprising:
a management controller, comprising a processor and a storage device, wherein the management controller is configured to provide a plurality of services; and
a containerized toolbox module, configured to be provided in the storage device and executable at the processor of the management controller, the containerized toolbox module comprising a plurality of testing tools for a web-based protocol and an Intelligent Platform Management Interface (IPMI) protocol, wherein the web-based protocol is a Representational State Transfer (REST) protocol, and the containerized toolbox module, when executed at the processor, is configured to:
receive a testing command to perform a plurality of tests to the services of the management controller, wherein each of the services is accessible under at least one of the web-based protocol and the IPMI protocol; and
perform, based on the testing command, the tests to the services of the management controller using the testing tools of the containerized toolbox module,
wherein the containerized toolbox module is a docker container module comprising:
a REST script library comprising the testing tools for the REST protocol;
an IPMI test library comprising the testing tools for the IPMI protocol; and
an environment file storing information for the tests to be performed to each of the hardware and software services of the management controller.

10. The system of claim 9, wherein the management controller is a baseboard management controller (BMC).

11. The system of claim 9, wherein the tests to the services of the management controller comprise, for a designated service of the services:
a stress test to the designated service, wherein the stress test comprises a plurality of repeated tests to the designated service using one of the testing tools; and
a plurality of integrated tests to the designated service, wherein the integrated tests comprise:
a REST-related test to the designated service under the REST protocol using a corresponding testing tool of the testing tools for the REST protocol; and
an IPMI-related test to the designated service under the IPMI protocol using a corresponding testing tool of the testing tools for the IPMI protocol.

12. The method of claim 11, wherein the testing command is a REST command in a human-readable format, and the containerized toolbox module is configured to perform the integrated tests for the designated service by:
determining the designated service based on information of the REST command;
performing the REST-related test to the designated service using the corresponding testing tool for the REST protocol;
performing the IPMI-related test to the designated service using the corresponding testing tool for the IPMI protocol; and
performing a comparison between test results of the REST-related test and the IPMI-related test.

13. A non-transitory computer readable medium storing computer executable code, wherein the computer executable code comprises a containerized toolbox module comprising a plurality of testing tools for a web-based protocol and an Intelligent Platform Management Interface (IPMI) protocol, and the containerized toolbox module, when executed at a processor of a management controller, is configured to:
receive a testing command to perform a plurality of tests to a plurality of services provided by the management controller, wherein each of the services is accessible under at least one of the web-based protocol and the IPMI protocol; and
perform, based on the testing command, the tests to the services of the management controller using the testing tools of the containerized toolbox module,
wherein the web-based protocol is a Representational State Transfer (REST) protocol, and the containerized toolbox module is a docker container module comprising:
a REST script library comprising the testing tools for the REST protocol;
an IPMI test library comprising the testing tools for the IPMI protocol; and
an environment file storing information for the tests to be performed to each of the hardware and software services of the management controller.

14. The non-transitory computer readable medium of claim 13, wherein the management controller is a baseboard management controller (BMC).

15. The non-transitory computer readable medium of claim 13, wherein the tests to the services of the management controller comprise, for a designated service of the services:
a stress test to the designated service, wherein the stress test comprises a plurality of repeated tests to the designated service using one of the testing tools; and
a plurality of integrated tests to the designated service, wherein the integrated tests comprise:
a REST-related test to the designated service under the REST protocol using a corresponding testing tool of the testing tools for the REST protocol; and
an IPMI-related test to the designated service under the IPMI protocol using a corresponding testing tool of the testing tools for the IPMI protocol.

16. The non-transitory computer readable medium of claim 15, wherein the testing command is a REST command in a human-readable format, and the containerized toolbox module is configured to perform the integrated tests for the designated service by:
determining the designated service based on information of the REST command;
performing the REST-related test to the designated service using the corresponding testing tool for the REST protocol;
performing the IPMI-related test to the designated service using the corresponding testing tool for the IPMI protocol; and
performing a comparison between test results of the REST-related test and the IPMI-related test.

* * * * *